United States Patent [19]

Marcusson et al.

[11] 4,241,666
[45] Dec. 30, 1980

[54] RAILWAY CAR ELECTRIC TRACTION MOTOR AIR COOLING SYSTEM

[75] Inventors: Lage Marcusson; Lars Polheimer, both of Vesteras, Sweden

[73] Assignee: ASEA Aktiebolag, Vesteras, Sweden

[21] Appl. No.: 823,675

[22] Filed: Aug. 11, 1977

[30] Foreign Application Priority Data

Aug. 19, 1976 [SE] Sweden .................... 7609214

[51] Int. Cl.³ .................. B61C 3/00; B61C 9/38; B61C 17/00
[52] U.S. Cl. .................................. 105/59; 105/133
[58] Field of Search .................. 105/59, 82, 133

[56] References Cited

U.S. PATENT DOCUMENTS

| | | | |
|---|---|---|---|
| 724,949 | 4/1903 | Rowland | 105/59 |
| 880,477 | 2/1908 | Brinckerhoff | 105/59 |
| 1,160,715 | 11/1915 | Howell | 105/82 |
| 3,116,700 | 1/1964 | Aydelott | 105/59 |
| 3,828,692 | 8/1974 | Kreissig | 105/59 X |

Primary Examiner—Howard Beltran
Attorney, Agent, or Firm—Watson, Cole, Grindle & Watson

[57] ABSTRACT

An air-cooling system for electric traction motors of a bogie of a motorized railway vehicle is shown which tends to reduce problems in drawing air through a cooling air channel to the traction motors and helps to reduce the problems encountered by the failure of a cooling fan for such electric traction motors. The air-cooling system is adapted for use with at least two air-cooled electric traction motors where each motor is coupled to an axle of a truck, the system comprising a common cooling air channel in communication with each traction motor and at least two intake channels communicating with the common cooling air channel, each intake channel including an air intake, a separately driven fan and valve means for preventing air from flowing out the intake upon failure of a fan to operate properly.

3 Claims, 3 Drawing Figures

RAILWAY CAR ELECTRIC TRACTION MOTOR AIR COOLING SYSTEM

BACKGROUND OF THE INVENTION

The present invention relates to a motorized railway vehicle having a truck with at least two air-cooled electric traction motors coupled to shafts of the truck, and more particularly, to an air-cooling system for such electric traction motors.

In motorized railway vehicles, a number of trucks each having air-cooled electric traction motors are provided to propel the vehicle. As a rule, the axle of each wheel pair of a truck is coupled to an electric drive traction motor by means of a gear reduction set. In order to obtain high power within a limited motor volume, the electric traction motors are usually fan-cooled and each is provided with a cooling air fan and a cooling air channel for providing cooling air to the fan. However, the available space for cooling air channels in a railway vehicle is limited and drawing air through these channels may involve various problems. If the motors are not cooled by proper operation of the air-cooling system, rapid overheating of the motors occurs and ultimately, cause damage to the motors. Therefore, the electric traction motors should not be utilized if the cooling system, particularly the cooling fan for the cooling system, is inoperative.

SUMMARY OF THE INVENTION

In accordance with the present invention, these difficulties in drawing in air through the cooling air channels and the problems occasioned in the event of failure of a cooling fan are reduced, or even eliminated, by connecting at least two electric traction motors of a truck to a common cooling air channel and by supplying cooling air to the cooling air channel with two parallel-working and separately driven fans, each located in a separate intake channel containing a cooling air intake. Located between the common cooling air channel and the separate cooling air intake channels containing the fans are valve means which help prevent the flow of cooling air from the common cooling air channel out through the cooling air intake when the particular fan is not operating. The valve means are suitably constructed as automatically acting non-return valves of the clack type having clacks or lips of rubber, plastic or thin sheet metal which are held in an open position during the flow of cooling air caused by the fan and automatically return to a closed position when air flow ceases due to the stoppage of a fan.

The cooling air intakes of the intake channels are preferably located at an upper portion of the railway vehicle where the air to be drawn into the intake is less likely to be contaminated by dust or other foreign matter. In addition, the cooling air intakes of the intake channels are provided with suitable filters and water separators so as to help prevent harmful material such as dust and the like from accompanying the cooling air to the traction motors.

By using the air cooling system of the present invention in a motorized railway vehicle, the drawing of air through the cooling channels is facilitated and therefore enables the production of a restricted, although considerable, power from the electric traction motors. In addition, in the situation where a fan blade or a fan motor of a fan has become damaged and therefore inoperative, the invention still enables a motorized railway vehicle to operate at a limited speed since moe than 50% of the normal power can still be obtained. Therefore, upon failure of a fan, a speed-limiting power shortage only occurs when maximum power is needed such as upon acceleration and traveling over track sections with a sharp incline. By operating the cooling-air fans in a parallel manner, the reliability of operation of the motorized railway vehicle is increased and the expensive and irritating consequences for railway operation due to damage to a small but important component such as a fan are reduced.

The present invention will be described in more detail with reference to the accompanying drawing.

DETAILED DESCRIPTION OF THE PREFERRED EMBODIMENT

Figure 2:
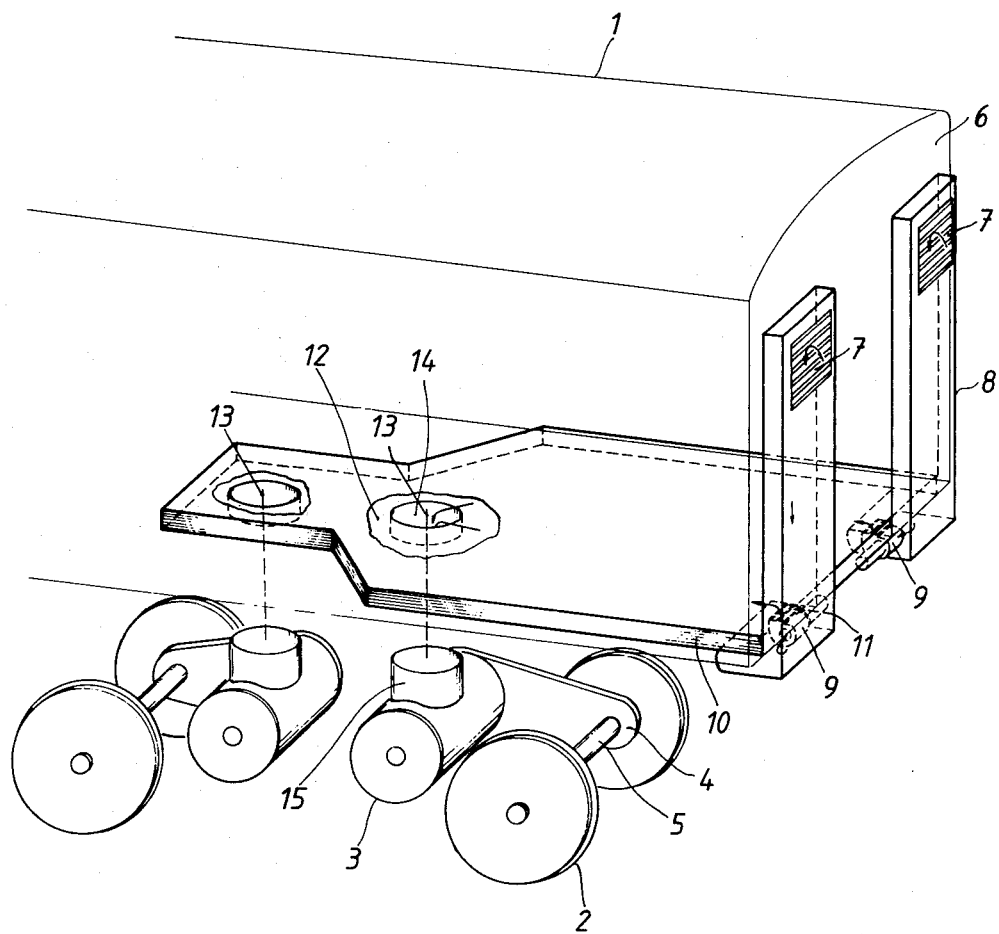
FIG. 2 represents a cross-sectional side view of an air intake channel with air intake, and its connection to a common cooling air channel in an air-cooling system in accordance with the present invention.
Figure 3:
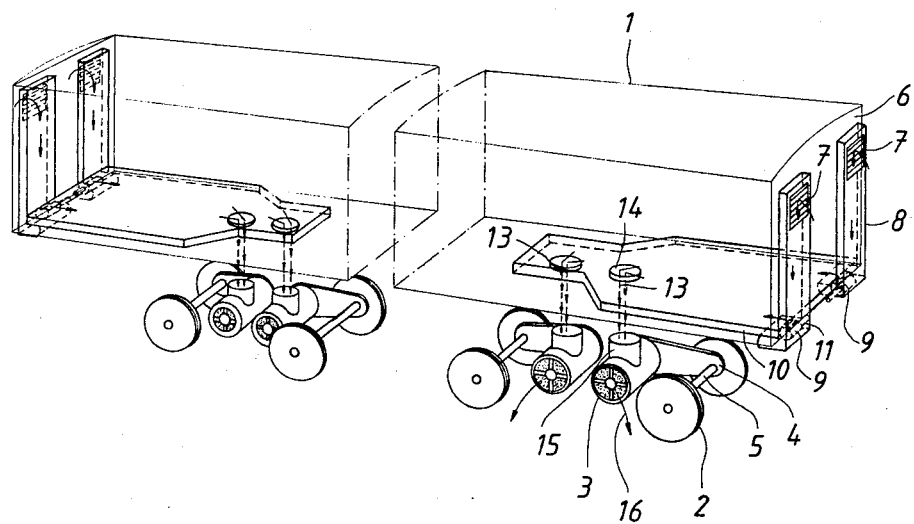
FIG. 3 shows a perspective view of one entire motorized railway vehicle which utilizes air-cooling systems at each end thereof to supply cooling air to the electric traction drive motors operating each of the two bogies thereunder.

Referring to the accompanying drawings wherein like numerals refer to like structural elements, a motorized railway vehicle 1 is shown in FIG. 3 to be supported by two truck which each have electric traction drive motors supplied with cooling air by a cooling air supply system in accordance with the present invention. As shown in larger scale in FIG. 1, each truck comprises two pairs of wheels 2, frame 17, two electric traction drive motors 3 and a power transmission 4 between each drive motor and drive axle 5 of each wheel pair or wheel set. The drive motors 3 are cooled by air provided by a cooling air system of the present invention. Cooling air comes into the system at the upper portion of end wall 6 of the body of vehicle 1 through air intakes 7 which are provided with water separators and filters (not shown) for removing solid contaminants from the air. The air intakes 7 are located at the upper portion of vertical air intake channels 8. Two parallel-working and separately driven cooling air fans 9 are connected on their suction sides to the vertical intake channels 8 and on their pressure sides to horizontal common cooling air channel 10 located under the body of vehicle 1. As best seen in FIG. 2, positioned between each fan 9 and the common cooling air channel 10 is a non-return valve 11 which helps prevent the flow of air from common cooling air channel 10 back through a fan in the event of failure of the fan.

On the bottom surface 12 of the common cooling air channel 10 are openings 13, each having a flange 14, just above the cooling air intake 15 of each of the drive motors 3. Between the flange 14 and cooling air intake 15 of each of the drive motors 3 is a bellows (not shown) which absorbs movement between the bogie and the body of the vehicle 1.

Figure 1:
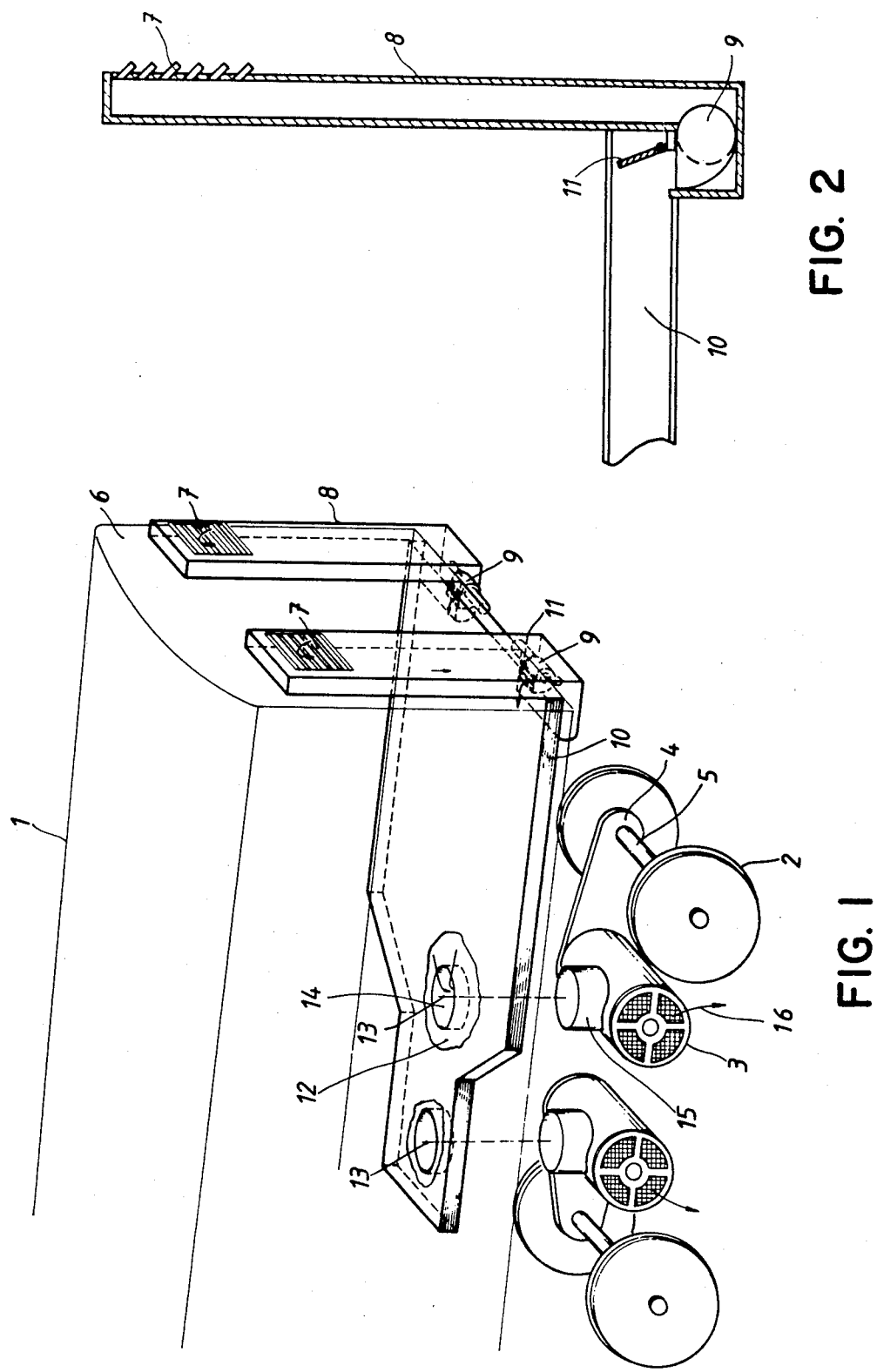
FIG. 1 depicts a partial perspective view of one end of a motorized railway vehicle embodying an air-cooling system for the electric traction drive motors in the trucks thereunder.

The arrows shown in FIGS. 1 and 3 indicate the direction of flow of the cooling air during the operation of the cooling air system of the present invention. Air flows through each intake 7 and down through the respective intake channels 8 and thence into the common cooling-air channel 10. From the common cooling-air channel 10, the air flows through openings 13 and down through flange 14 into the intake 15 of each drive motor 3 whereby the motor is cooled and then the air is exhausted through exhaust parts as indicated by arrows 16.

While the present invention has been described with reference to a particular embodiment thereof, it will be understood that numerous modifications may be made by those skilled in the art without actually departing from the spirit and scope of the invention as defined in the appended claims.

We claim:

1. A motorized railway vehicle comprising an elongated vehicle body having ends, and at least one supporting truck for said vehicle body; each said truck including two driven wheelsets, and each truck including an air-cooled electric traction motor connected to drive the wheelsets, each traction motor including an air intake means extending towards said vehicle body and an air exhaust port; said vehicle body including a common hollow cooling air channel with means for supplying cooling air to each said air intake means of each traction motor, means forming two separate cooling air intakes which are mounted on the ends of said vehicle body, means forming two separate air intake channels for conveying air from each respective said air intake means to said common, hollow cooling air channel in a parallel fashion, separate fans positioned in each air intake channel for forcing air into said common, hollow cooling channel, and separate valve means positioned between each said air intake channel and said common hollow cooling air channel for preventing any return air flow from said common, hollow cooling air channel to each said air intake channel.

2. The motorized railway vehicle of claim 1 wherein each said separate valve means is positioned between each respective fan in each air intake channel and said common, hollow cooling air channel.

3. The motorized railway vehicle of claim 2 wherein two supporting bogies are positioned in supporting relationship to said vehicle body.

* * * * *